INVENTORS
Gerald D. Brode
& Thomas D. Ward
BY Sughrue, Rothwell, Mion & Zinn
ATTORNEYS INVENTORS
Gerald D. Brode
& Thomas D. Ward
BY
Sughrue, Rothwell, Mion & Zinn
ATTORNEYS United States Patent Office 3,215,852
Patented Nov. 2, 1965

3,215,852

MONOSTABLE TRANSISTOR TRIGGER HAVING BOTH TRANSISTORS NORMALLY BIASED IN THE NON-CONDUCTING STATE

Gerald D. Brode, Sayre, Pa., and Thomas D. Ward, Apalachin, N.Y., assignors to International Business Machines Corporation, New York, N.Y., a corporation of New York Filed June 29, 1960, Ser. No. 39,600
2 Claims. (Cl. 307—88.5)

This invention relates to monostable trigger circuits and more particularly to a monostable trigger circuit using two complementary transistors.

Monostable trigger circuits of the type which produce an output gate of a predetermined time duration in response to the application of an input pulse are well known in the art. These trigger circuits have a stable and an astable state. The input pulse triggers the monostable circuit into its astable state and the circuit remains in this astable state for a time period dependent upon the parameters of the circuit, after which the trigger circuit returns to its stable condition.

In many applications the time between trigger pulses is quite long compared to the duration of the output gate. That is, the trigger circuit is in its stable state for periods of time which are quite long compared to the time that the trigger circuit is in its astable state. Prior art monostable circuits have been designed so that one of the transistors used in the circuit is conducting when the circuit is in its stable condition. As a result, there is unnecessary power dissipation in the circuit where the circuit is used in applications in which the triggering pulses occur infrequently compared to the time duration of the gate output.

Another disadvantage of prior art monostable circuits is that the base current of one transistor is usually supplied through the timing resistor which determines the time duration that the circuit is in its astable state. The disadvantage of supplying the base current of a transistor through the timing resistor is that the maximum value of resistance is limited by the necessary base current that must be supplied. If the base current does not limit the value of the resistor, then a larger value of resistance and a smaller value of capacitance may be used to obtain a given time constant. This is quite desirable since capacitors cannot be obtained with the close tolerances that resistors exhibit.

Accordingly, it is an object of the present invention to provide a monostable transistor trigger circuit in which both transistors are non-conducting when the circuit is in the quiescent state.

It is another object of the present invention to provide an improved monostable transistor trigger circuit having a reduced power dissipation.

It is still another object of the present invention to provide an improved monostable transistor trigger circuit in which the base current of neither transistor is supplied through the timing resistor of the circuit.

Figure 1:
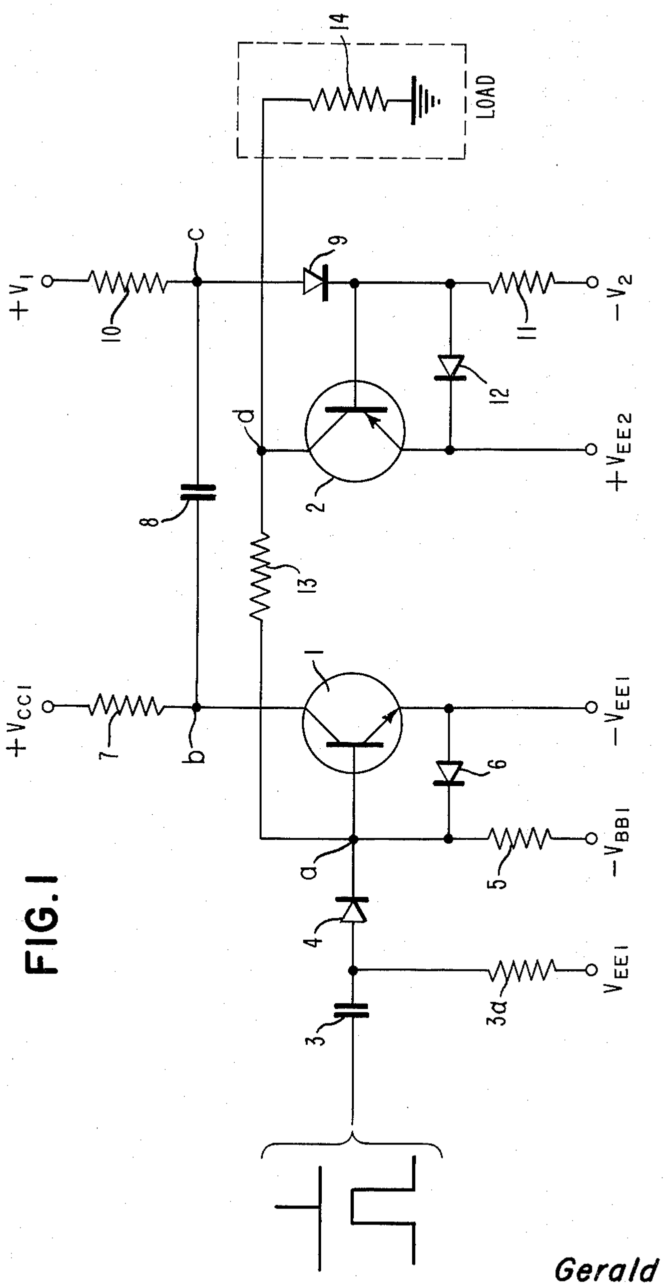

These and further objects of the present invention will become apparent from the following description and appended claims taken in conjunction with the drawings in which:

FIGURE 1 is a circuit diagram of the monostable trigger circuit of the subject invention;

FIGURES 2*a* through 2*d* show waveforms depicting the operation of the monostable trigger circuit of the subject invention.

In accordance with one aspect of this invention, a monostable trigger circuit is provided utilizing two transistors of opposite conductivity types. Both transistors are biased in the normally non-conducting state. The input trigger pulses are applied to the base of the first of these transistors and are of a polarity such that the trigger pulse renders the first transistor conducting. When the first transistor becomes conducting, the collector voltage of this transistor drops and this voltage drop is coupled through a timing capacitor to the anode of a biasing diode. This voltage drop back biases the diode and this in turn causes the second transistor to conduct. The voltage on the timing capacitor then rises exponentially toward a reference voltage. When the voltage on the timing capacitor reaches the point at which the biasing diode is again forward biased, the second transistor is cut off. Feedback from the collector of the second transistor back to the base of the first transistor also cuts the first transistor off at this time. The output of the circuit is taken from the collector of the second transistor at which point a gate of specified duration appears when the circuit is in the astable condition.

Referring to FIGURE 1, the transistor circuit includes a first transistor 1, shown as being of the NPN type, and a second transistor 2, of the PNP type. Input trigger pulses are applied through an input capacitor 3 and isolating diode 4 to the base of transistor 1. A resistor 3*a* is connected between a voltage $V_{EE1}$ and the diode 4 for referencing purposes.

A source of negative biasing potential, designated $-V_{EE1}$, is connected to the emitter of transistor 1. A more negative source of potential, designated $-V_{BB1}$, is connected through a biasing resistor 5 to the base of transistor 1. A biasing diode 6 is connected between the emitter and base of transistor 1 with a polarity such that a small current flows through the diode. This biasing current is sufficient to maintain transistor 1 in the normally non-conducting state.

The collector of transistor 1 is connected through a resistor 7 to a source of collector potential, designated $+V_{CC1}$, and is also coupled through a timing capacitor 8 and a diode 9 to the base of transistor 2 so that the transistor 2 is rendered conducting when transistor 1 conducts. A source of timing voltage, designated $+V_1$, is connected through a timing resistor 10 to the capacitor 8. After both transistors are rendered conducting, the voltage on the capacitor 8 rises exponentially toward $+V_1$. The time required to charge the capacitor to the point at which the transistor 2 again becomes non-conducting is dependent upon the values of the timing capacitor 8, the timing resistor 10 and the source of timing voltage $+V_1$.

Transistor 2 is normally back biased by current flow from $+V_1$ through timing resistor 10, diode 9 and resistor 11 to the source of potential designated $-V_2$. The voltage at the junction of diode 9 and resistor 11 is established at a value more positive than the source of biasing voltage designated $+V_{EE2}$ which is connected to the emitter of transistor 2. A diode 12 is connected between the base and the emitter of transistor 2 with a polarity such that a small current flow through the diode maintains the transistor in the normally non-conducting state.

In order to return the first transistor to the non-conducting state when the timing capacitor is charged to the point at which the second transistor becomes non-conducting, the collector of transistor 2 is connected through a resistor 13 to the base of transistor 1. The output of the monostable circuit is also taken from the collector of transistor 2 and is connected to a load which is shown schematically as the resistor 14.

Figure 2A:
Figure 2B:
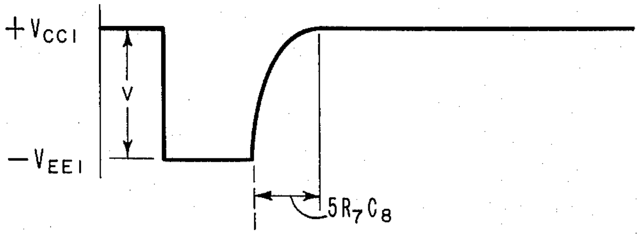
Figure 2C:
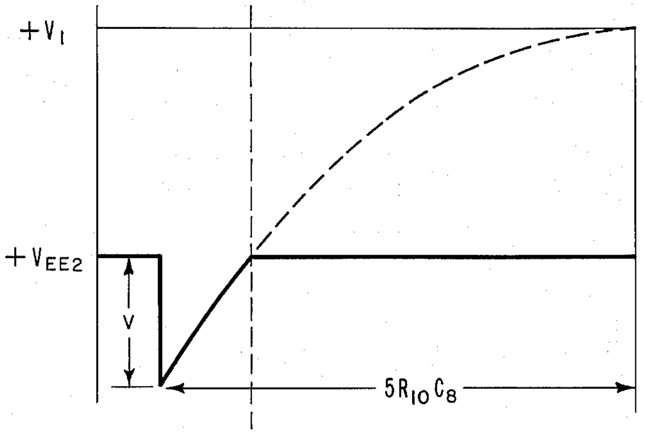
Figure 2D:
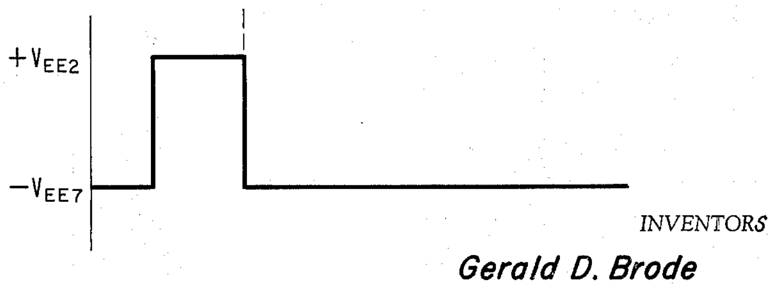

The operation of the monostable circuit of this invention can best be described with reference to the waveforms shown in FIGURE 2. FIGURE 2*a* shows the triggering pulse at the base of transistor 1, point *a*. As shown in FIGURE 2*b*, the input pulse causes transistor 1 to conduct and the collector of transistor 1, point *b*, falls to the voltage $-V_{EE1}$. This voltage drop is coupled through the timing capacitor 8 to the anode of diode 9, point *c*, as shown in FIGURE 2*c*. This drop in potential causes the diode 9 to be back biased, which in turn allows transistor 2 to conduct base current from $+V_{EE2}$ through the emitter base junction and resistor 11 to $-V_2$. When transistor 2 is turned on, its collector voltage point *d*, rises to a value approximately equal to $+V_{EE2}$ as shown in FIGURE 2*d*.

The voltage on the timing capacitor, shown in FIGURE 2*c*, rises exponentially toward $+V_1$ at a rate determined by the RC time constant of timing resistor 10 and timing capacitor 8. When this voltage becomes positive enough to forward bias diode 9, the transistor 2 is turned off. When transistor 2 is turned off, base current can no longer be supplied to transistor 1 through the resistor 13 and transistor 1 is cut off. The collector of transistor 2 returns to its normal voltage, thus producing the gate output shown in FIGURE 2*d*.

While this invention has been described in conjunction with a specific embodiment, it will, of course, be understood that various other modifications may be made without departing from the principles of the invention. The appended claims are therefore intended to cover any such modifications within the true spirit and scope of the invention.

What we claim as new and desire to secure by Letters Patent of the United States is:

1. A monostable multivibrator comprising a first transistor of a first conductivity type, a second transistor of the opposite conductivity type, each of said transistors including base, emitter, and collector electrodes, means for normally biasing each of said transistors to the nonconducting state including a diode for each transistor connected between the emitter and base of the related transistor and poled so that current through the diode maintains the related transistor in the normally nonconducting state, means for triggering said first transistor to the conducting state, a timing circuit including a timing capacitor having one side connected to the collector of said first transistor, a timing resistor, and a source of timing voltage; a switching diode connected between said capacitor and the base of said second transistor, said capacitor being charged toward a first voltage when said first transistor is driven to the conducting state, said switching diode being poled so that it is back biased when said capacitor is charged toward said first voltage, said second transistor being driven into a conducting condition when said switching diode is back biased, said capacitor being discharged towards said timing voltage, whereby said switching diode becomes forward biased and said second transistor is cut off after a time period dependent upon the time constant of said timing circuit, and means coupling the collector of said second transistor to the base of said first transistor for restoring the latter to the nonconducting state.

2. A monostable trigger circuit for producing an output gate of a predetermined time duration in response to an input trigger pulse comprising a first transistor having base, emitter, and collector electrodes, a first source of biasing voltage connected to the emitter of said first transistor, a second source of biasing voltage connected to the base of said first transistor, a diode connected between said base and said emitter of said first transistor, said diode having a polarity such that current flow between said first and said second sources of biasing potential maintains said first transistor normally in the non-conducting state, a second transistor of a conductivity type opposite to that of said first transistor having base, emitter, and collector electrodes, a third source of biasing potential connected to the emitter of said second transistor, a fourth source of biasing voltage connected to the base of said second transistor comprising means to supply voltage at two different levels and means forming a series circuit path therebetween including a timing resistor, a second diode, and a bias resistor interconnected in the order stated, the base of said second transistor being connected to said series circuit path between said bias resistor and said second diode, a third diode connected between said base and said emitter of said second transistor, said third diode having a polarity such that current flow between said third and said fourth sources of biasing potential maintains said second transistor normally in the non-conducting state, means for applying the trigger pulse to the base of said first transistor, said trigger pulse being of a polarity such that said first transistor is driven into the conducting state by said trigger pulse, a timing capacitor connected between the collector of said first transistor and a point on said series circuit path between said timing resistor and said second diode; means connecting the collector of said second transistor to the base of said first transistor; said timing capacitor being charged through said timing resistor to said source of timing voltage after said first transistor, and then said second transistor, are driven to the conducting condition, whereby the conducting condition of said second transistor produces an output gate of a time duration determined by the characteristics of said timing capacitor, said timing resistor and said source of timing voltage.

References Cited by the Examiner

UNITED STATES PATENTS

| | | | |
|---|---|---|---|
| 2,770,732 | 11/56 | Chong. | |
| 2,831,113 | 4/58 | Weller | 307—88.5 |
| 2,937,291 | 5/60 | Harper | 307—88.5 |
| 2,976,428 | 3/61 | Parkhill et al. | 307—88.5 |
| 2,976,432 | 3/61 | Geckle | 307—88.5 |
| 3,033,998 | 5/62 | Nellis | 307—88.5 |
| 3,068,406 | 12/62 | Dellinger | 307—88.5 |

JOHN W. HUCKERT, *Primary Examiner.*

GEORGE N. WESTBY, *Examiner.*